Oct. 1, 1946.  C. LIEBLEIN  2,408,565
DETACHABLE SCREW CUTTING DISK AND TOOL SHANK
Filed June 7, 1944
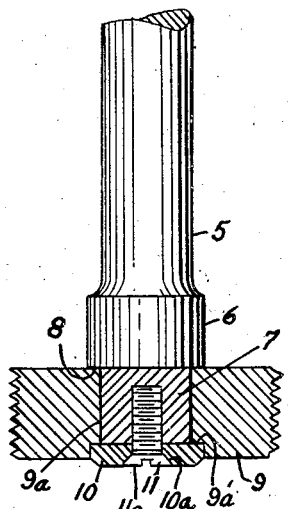
Fig. 6
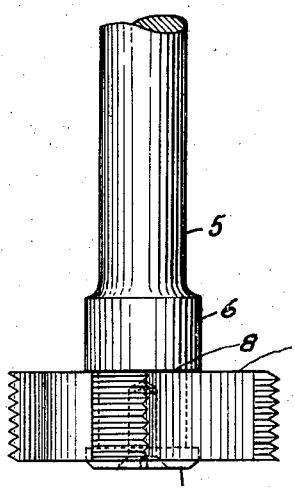
Fig. 1
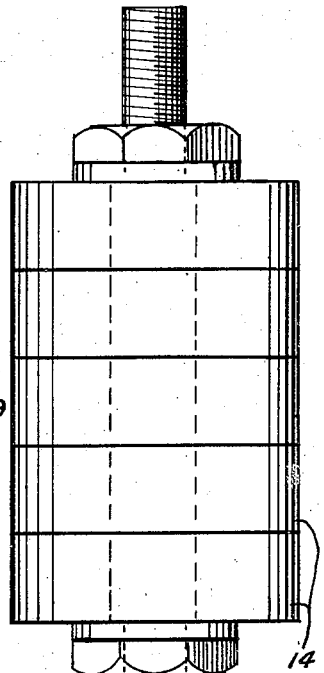
Fig. 9
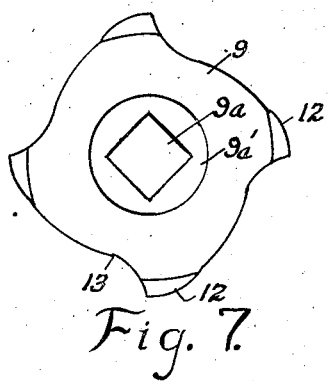
Fig. 7
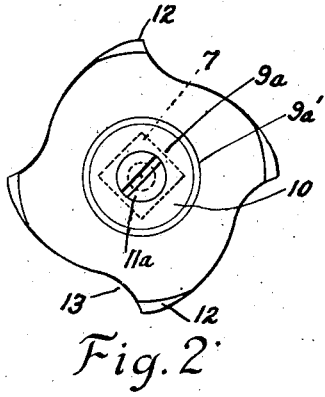
Fig. 2
Fig. 8.
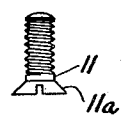
Fig. 5
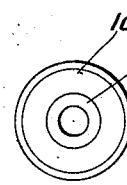
Fig. 3
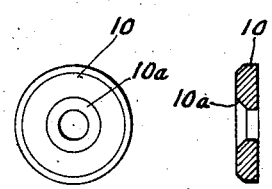
Fig. 4
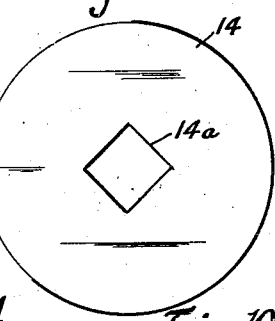
Fig. 10
INVENTOR.
Chaim Lieblein
BY Carl Miller
ATTORNEY Patented Oct. 1, 1946

2,408,565

UNITED STATES PATENT OFFICE 2,408,565

DETACHABLE SCREW-CUTTING DISK AND TOOL SHANK

Chaim Lieblein, Brooklyn, N. Y.

Application June 7, 1944, Serial No. 539,068

1 Claim. (Cl. 10—141)

This invention relates to an improved screw tap and one of its objects is to lower the cost of producing taps for forming screw threads in large diameter tubes and holes.

It is at present the common practice to form screw thread cutting taps upon a solid piece of tool steel, so as to provide the necessary thread cutting teeth and a shank for holding and operating the tool. When the threads are broken or otherwise rendered useless the whole tool must be rejected, or subjected to a complete regrinding or retooling operation. Screw taps of this type are not adapted for use in forming screw threads in large diameter tubes and holes.

My improved screw tap tool consists of a disk of hardened and ground steel suitable for this purpose, and a shank having a square stud which snugly fits in a square hole formed in the tool disk and a screw and washer set for holding the disk on the square stud, so that it may be removed and replaced with a new disk, or one of smaller size, or for a different screw thread.

Another object of the invention is to provide a screw tap, which includes a screw thread cutting disk, which can be arranged in multiples or gangs upon a squared shaft, so that the screw threads may be cut or formed, as by milling or grinding the whole group or gang at one time.

With the above and other objects in view the invention comprises certain new and useful constructions, combinations and arrangements of parts, clearly described in the following specification, and fully illustrated in the drawing, in which:

Fig. 1 is a side elevation of the combined tool.

Fig. 2 is an end view showing the disk, holding washer and its connecting screw.

Fig. 3 is a detail plan view of the washer.

Fig. 4 is a detail sectional view thereof.

Fig. 5 is a detail side view of a holding screw.

Fig. 6 is a central vertical sectional view showing the combined tool.

Fig. 7 is a plan view of the disk removed from the holding shank.

Fig. 8 is an end view of the tool shank.

Fig. 9 is a side view of a gang of blank disks arranged for milling the teeth on all disks in one operation.

Fig. 10 is a plan view of one of the blank disks.

Referring to the accompanying drawing illustrating the practical construction of the invention, 5 designates a shank of tool steel, which is provided with an integral head 6 and an end stud 7, centered axially thereon, and formed with a plurality of parallel sides, resulting from the milling of the stock from round to square or other polygonal form.

The end stud 7 is considerably smaller than the head 6, and the surface of the forward end of the head is disposed at right angles to the axis of the shank, and thus provides a thrust shoulder or bearing surface 8.

The cutting disk 9 is formed with a central opening 9a, which has a form corresponding to that of the stud 7, and is positioned on the stud 7 and against the thrust or bearing shoulder 8. The forward end of this disc is formed with a circular recess 9a which snugly receives the washer 10, and this washer is formed with a countersunk opening 10a which receives the screw 11, having a countersunk head 11a, and this screw is threaded in the stud 7, so as to secure the disk 9 on the stud 7 and against the shoulder 8.

The disk 9 is formed with a plurality of rows of screw thread cutting teeth 12, and in the construction shown there are four rows of such teeth, the rows being equally spaced from each other. The disk is relieved at 13, in advance of the leading or cutting edges of the teeth so that an efficient cutting action will result, and the forward or cutter side of the teeth 12 are disposed in a slight pitch to aid in effective thread cutting.

The cutting disks are formed from circular blanks 14 of tool steel, each having a square center hole 14a. These blanks are mounted on the square shank or mandrel 15, clamped against each other, and then the screw threads are cut upon all of the disks at one time. The disks are then subjected to the usual finishing operations, when they are ready for use.

I have found that my improved method of manufacture materially reduces the cost of forming the screw tapping disks, and that it is more economical to replace a disk having broken teeth, than it would be to purchase a large screw thread tap of corresponding size and capacity.

Having described my invention I claim as new:

A thread cutting tool, comprising a shank having a polygonal stud on one end thereof and a shoulder at the inner end of said stud, said stud being disposed centrally of the shank, a disk having a central opening which receives the polygonal stud and disposed against said shoulder, said disk having a plurality of radial lands provided with screw cutting teeth, and also formed with a recess concentric with said central opening, a washer disposed in said recess and engaging the outer end of the stud, and a screw extending through the washer and threaded into the stud for retaining the disk on the stud between said washer and said shoulder.

CHAIM LIEBLEIN.